United States Patent
Way et al.

(10) Patent No.: US 6,272,553 B2
(45) Date of Patent: *Aug. 7, 2001

(54) MULTI-SERVICES COMMUNICATIONS DEVICE

(75) Inventors: Bryan George Way, Overland Park; Bryan Lee Gorman, Mission; Robert Walter Plamondon, Olathe; David Allison Rush, Merriam, all of KS (US)

(73) Assignee: Sprint Communications Company, L.P., Kansas City, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,575

(22) Filed: Jan. 7, 1999

Related U.S. Application Data

(63) Continuation-in-part of application No. 09/197,044, filed on Nov. 20, 1998.

(51) Int. Cl.[7] .......................... H04L 12/54; H04L 12/66; G06F 13/00
(52) U.S. Cl. ......................... 709/250; 709/227; 709/230; 709/251; 379/395; 370/468
(58) Field of Search .................................. 709/250, 200, 709/230, 251

(56) References Cited

U.S. PATENT DOCUMENTS

| | | | |
|---|---|---|---|
| 5,844,568 | * 12/1998 | Luther | 345/432 |
| 5,881,142 | 3/1999 | Frankel et al. | 379/167 |
| 5,933,607 | * 8/1999 | Tate et al. | 379/395 |
| 5,963,620 | 10/1999 | Frankel et al. | 379/93.05 |
| 6,012,100 | * 1/2000 | Frailong et al. | 709/250 |
| 6,075,884 | 6/2000 | Frankel et al. | 370/356 |
| 6,078,733 | * 6/2000 | Osborne | 395/200.8 |
| 6,115,755 | * 9/2000 | Krishan | 709/250 |
| 6,118,768 | * 9/2000 | Bhatia et al. | 370/254 |
| 6,141,339 | 10/2000 | Kaplan et al. | 370/352 |

OTHER PUBLICATIONS

N/A, "The PacComm '320' Series Dual–modem HF/VHF Packet Controller," www.paccomm.com, PacComm.
N/A, "The Residential Gateway Functional Specifications," www.interactivehg.org, N/A.

* cited by examiner

*Primary Examiner*—Viet D. Vu
*Assistant Examiner*—Debbie M Le
(74) *Attorney, Agent, or Firm*—Harley R. Ball

(57) ABSTRACT

A multi-services communications device provides internal control over communications, so that computer control input is not required. Communications performance is improved, especially for real time communications such as telephone conversations, because the multi-services communications device does not wait on late or failed control input from the computer. The multi-services communications device is comprised of a communications processing system connected to a network interface, telephone interface, video interface, and computer interface. The communications processing system controls: 1) the exchange of telephone signals with a telephone connection, 2) the exchange of video signals with a video connection, 3) the exchange of data with a computer connection, and 4) the exchange of the data, video signals, and voice signals with a network connection.

10 Claims, 4 Drawing Sheets

MULTI-SERVICES COMMUNICATIONS DEVICE

RELATED APPLICATIONS

This application is a continuation-in-part of U.S. patent application entitled, "AUTONOMOUS MULTI-SERVICES CARD", filed on Nov. 20, 1998, Ser. No. 09/197,044, (Sprint Docket 1239), and assigned to the same entity as this application is a continuation-in-part of U.S. patent application entitled , "Telecommunications System", filed on Aug. 30, 2000, application No. 09/650,984 (Sprint Docket 1156A), and assigned to the same entity as this application, which is a continuation of U.S patent application entitled "Telecommunications System", filed Apr. 04, 1997, application No. 08/826,641 (Sprint Docket 1156), now U.S. Pat. No. 6,141,339; and this application is a continuation-in-part of U.S patent application entitled, "Telecommunication System", filed Aug. 30, 2000, application No. 09/650,560 (Sprint Docket 1156B), and assigned to the same entity as this application, which is a continuation of U.S. patent application entitled, "Telecommunications System", filed on Apr. 04, 1997, application No. 08/826,641 (Sprint Docket 1156), now U.S. Pat. No. 6,141,339.

FEDERALLY SPONORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to a multi-services communications device that connects communications devices, such as a computer, a telephone device, and a video device, to a communications network.

2. Description of the Prior Art

A network interface card allows a computer to communicate with a communications network. Typically, the computer provides control input to the network interface card. Unfortunately, communications performance is adversely affected by using the computer to control the network interface card.

The computer typically executes an operating system and a variety of software applications. Thus, computer processing time is shared across multiple software components. Communications performance suffers as a result because the computer may not provide control input to the network interface card in a timely manner. Since many forms of communication are real-time in nature, such as a telephone conversation, the lack of timely computer control can severely disrupt communications. In addition one of the software applications may cause the computer to crash, so that no control input is provided to the network interface card. In this case, communications would cease altogether.

SUMMARY OF THE INVENTION

The invention solves the above problem with a multi-services communications device that provides internal control over communications so that computer control input is not required. Communications performance is improved, especially for real time communications such as telephone conversations, because the multi-services communications device does not wait on late or failed control input from the computer.

The multi-services communications device comprises a computer interface that is configured for coupling to a computer connection and that is operational to exchange data communications with the computer connection. The multi-services communications device comprises a telephone interface that is configured for coupling to a telephone connection and that is operational to exchange analog telephone signals with the telephone connection. The multi-services communications device comprises a video interface that is configured for coupling to a video connection and that is operational to exchange video signals with the video connection. The multi-services communications device comprises a network interface that is configured for coupling to a network connection. The network interface is operational to exchange asynchronous transfer mode communications, Ethernet communications, internet communications, digital subscriber line communications, and/or modem communications with the network connection. The multi-services communications device comprises a communications processing system that is operational to control the exchange of the data communications with the computer connection. The communications processing system is operational to control the exchange of the analog telephone signals with the telephone connection without any control input from the computer connection. The communications processing system is operational to control the exchange of the video signals with the video connection. The communications processing system is operational to control the exchange of asynchronous transfer mode communications, Ethernet communications, internet communications, digital subscriber line communications, and modem communications with the network connection. Communication paths connect the communications processing system with the computer interface, the telephone interface, the video interface, and the network interface. An enclosure houses the communication paths, the communications processing system, the computer interface, the telephone interface, the video interface, and the network interface.

It should be noted that the communications processing system can control the exchange of telephone or video signals without any control input from the computer. This represents a distinct advantage over prior systems that rely on the computer for control input. In these prior systems, communications between the telephone device and the communications network would suffer or fail if the control input from the computer was delayed.

DETAILED DESCRIPTION OF THE PREFERRED EMBODIMENT

Figure 1:
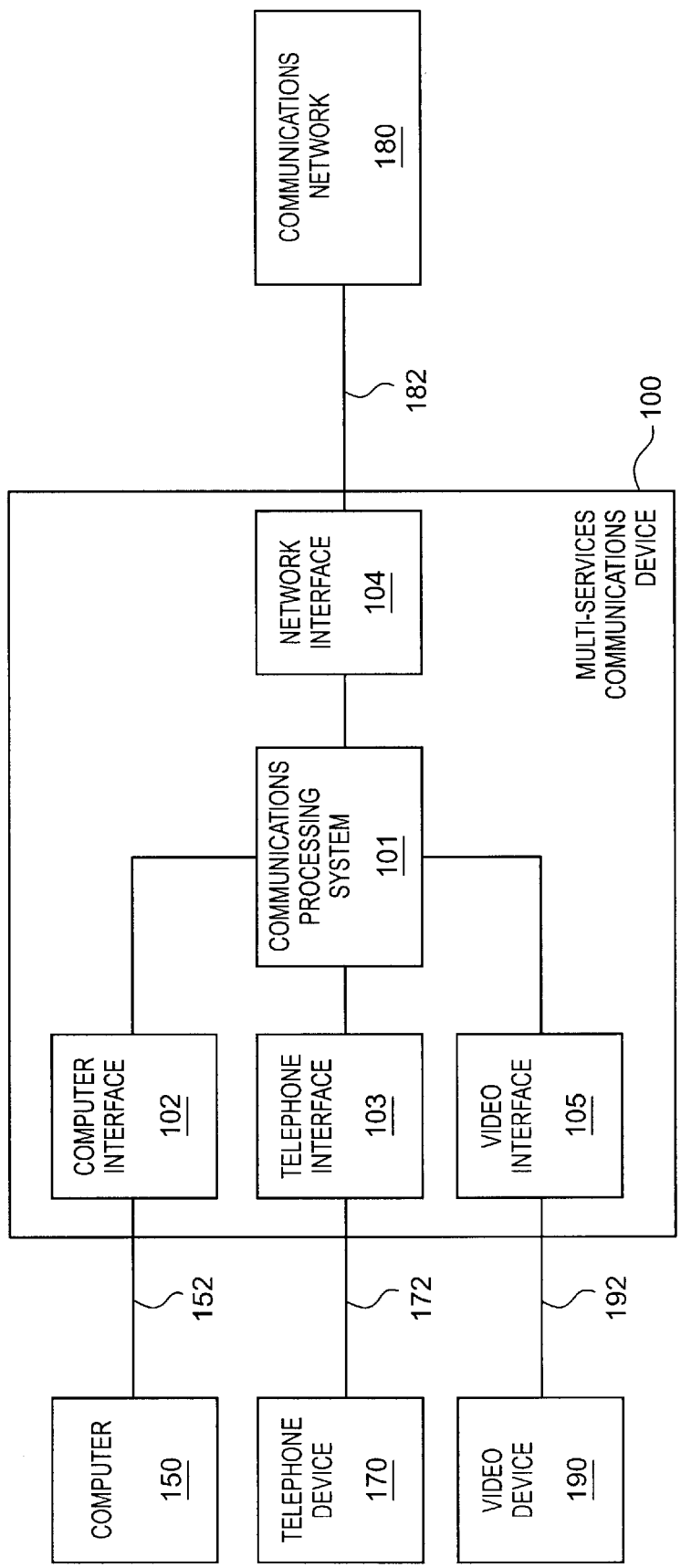
FIG. 1 is a block diagram of a multi-services communications device configuration and environment in an example of the invention.

FIG. 1 depicts a multi-services communications device 100. The multi-services communications device 100 is comprised of a communications processing system 101, computer interface 102, telephone interface 103, network interface 104, and video interface 105. Communication paths connect the communications processing system 101 to the computer interface 102, the telephone interface 103, the network interface 104, and the video interface 105. The multi-services communications device 100 is housed in an enclosure that could be a conventional plastic or metal box, such as the type typically used to house electronic components. Those skilled in the art will recognize that some conventional elements of the multi-services communications device 100 have been omitted for clarity.

The computer interface 102 is coupled to a computer 150 by a computer connection 152. The telephone interface 103 is connected to a telephone device 170 by telephone connection 172. The network interface 104 is connected to a communications network 180 by a network connection 182. The video interface 105 is coupled to a video device 190 by a video connection 192. If desired, the telephone connection 172 and the video connection 192 could be the same physical connection, and the telephone interface 103 and the video interface 105 could be integrated together.

The computer interface 102 could be any circuitry and logic that can be coupled to the computer connection 152 and that exchanges data with the computer connection 152. The telephone interface 103 could be any circuitry and logic that can be coupled to the telephone connection 172 and that exchanges telephone signals with the telephone connection 172. The video interface 105 could be any circuitry and logic that can be coupled to the video connection 192 and that exchanges video signals with the video connection 192. The network interface 104 could be any circuitry and logic that can be coupled to the network connection 182 and that exchanges the data, video signals, and voice signals with the network connection 182. The communications processing system 101 could be any circuitry and logic that controls: 1) the exchange of data with the computer connection 152, 2) the exchange of telephone signals with the telephone connection 172, 3) the exchange of video signals with the video connection 192, and 4) the exchange of the data, video signals, and telephone signals with the network connection 182.

The computer 150 communicates with the communications network 180 through the computer interface 102, the communications processing system 101, and the network interface 104. The telephone device 170 communicates with the communications network 180 through the telephone interface 103, the communications processing system 101, and the network interface 104. The video device 190 communicates with the communications network 180 through the video interface 105, the communications processing system 101, and the network interface 104.

It should be noted that the communications processing system 101 can control the exchange of voice or video signals without any control input from the computer 150. This represents a distinct advantage over prior systems that rely on the computer 150 for control input. In these prior systems, communications between the telephone device 170 and the communications network 180 would suffer or fail if the control input from the computer 150 was delayed.

Figure 2:
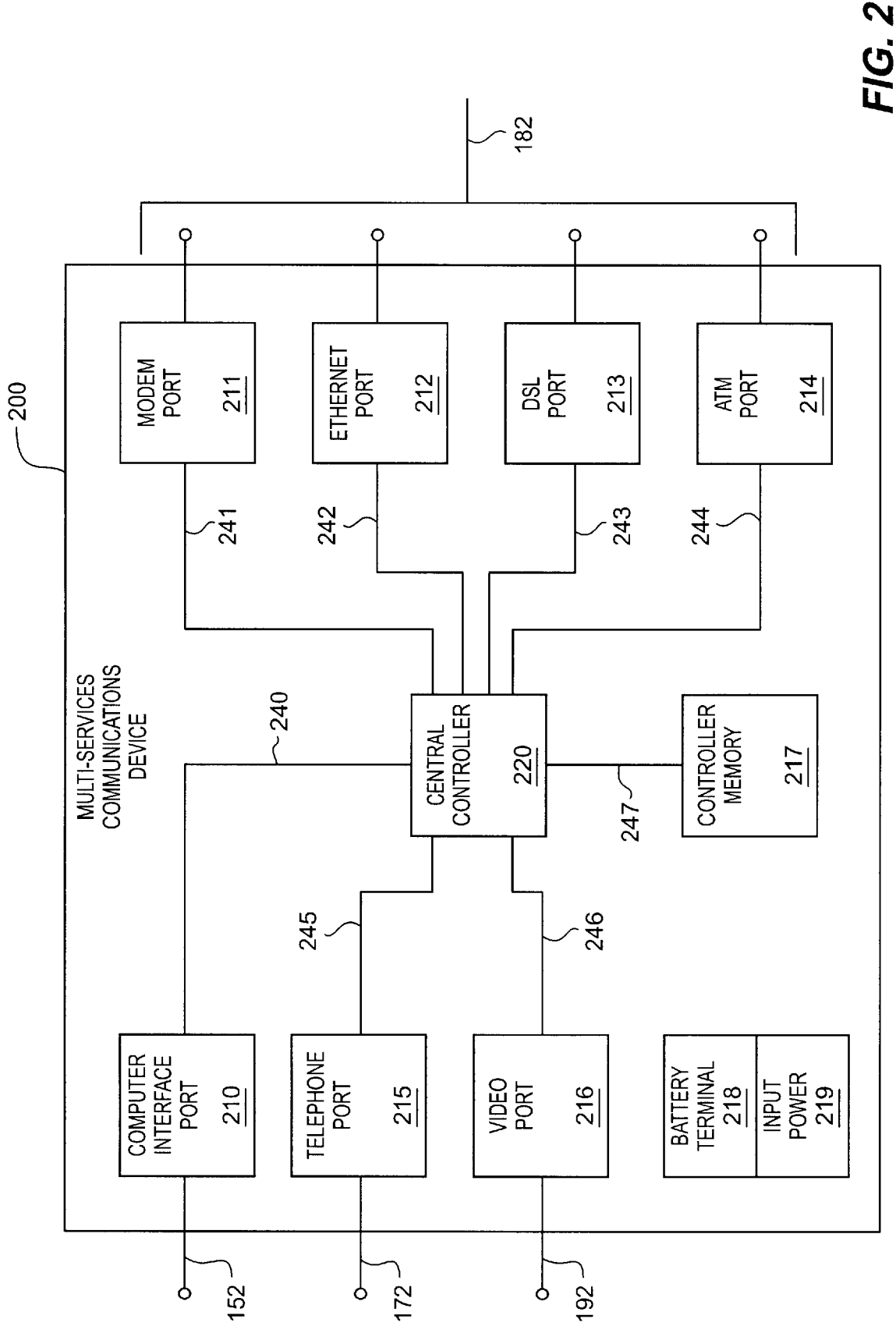
FIG. 2 is a detailed block diagram of a multi-services communications device configuration in an example of the invention.
Figure 3:
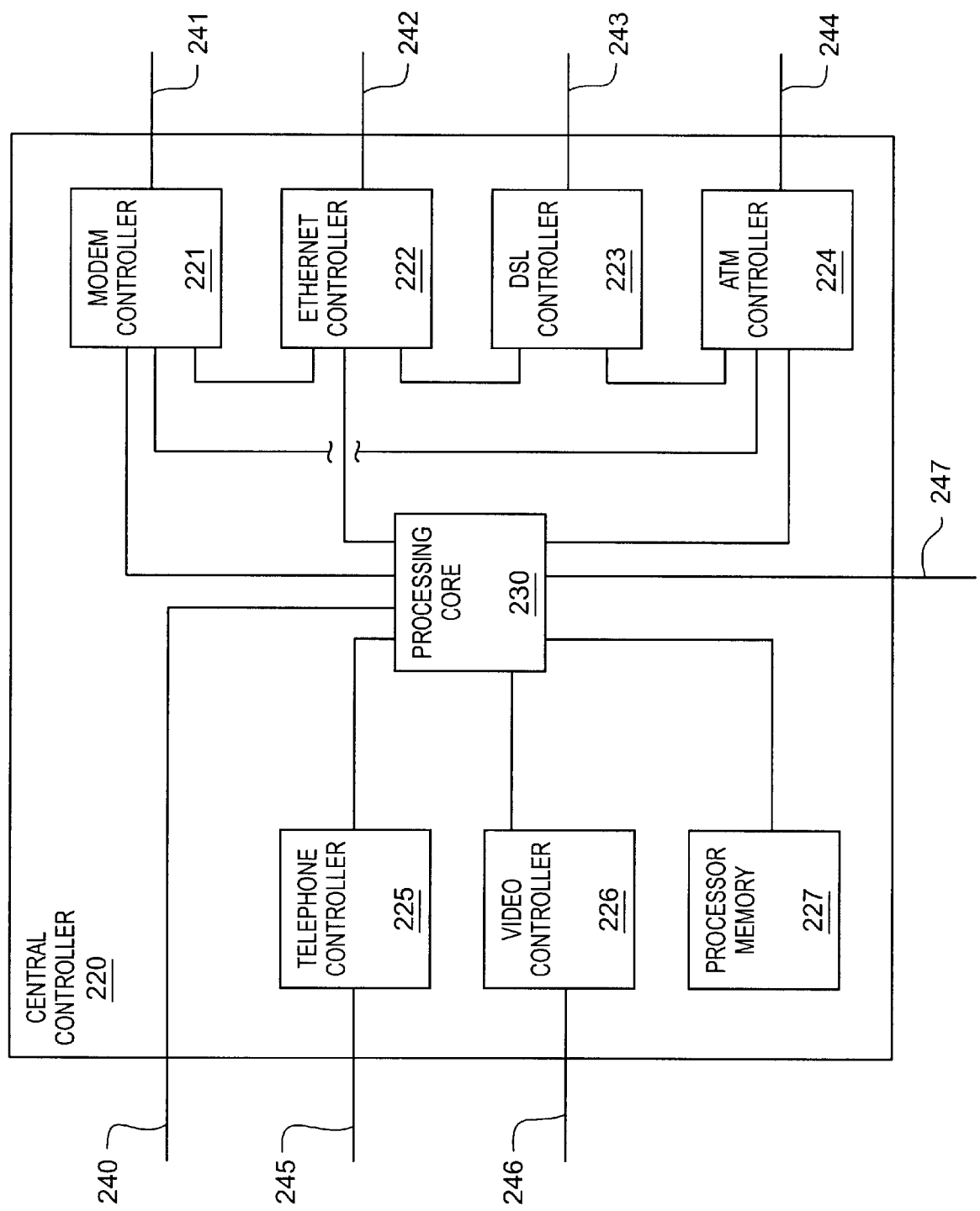
FIG. 3 is a detailed block diagram of a multi-services communications device central controller in an example of the invention.
Figure 4:
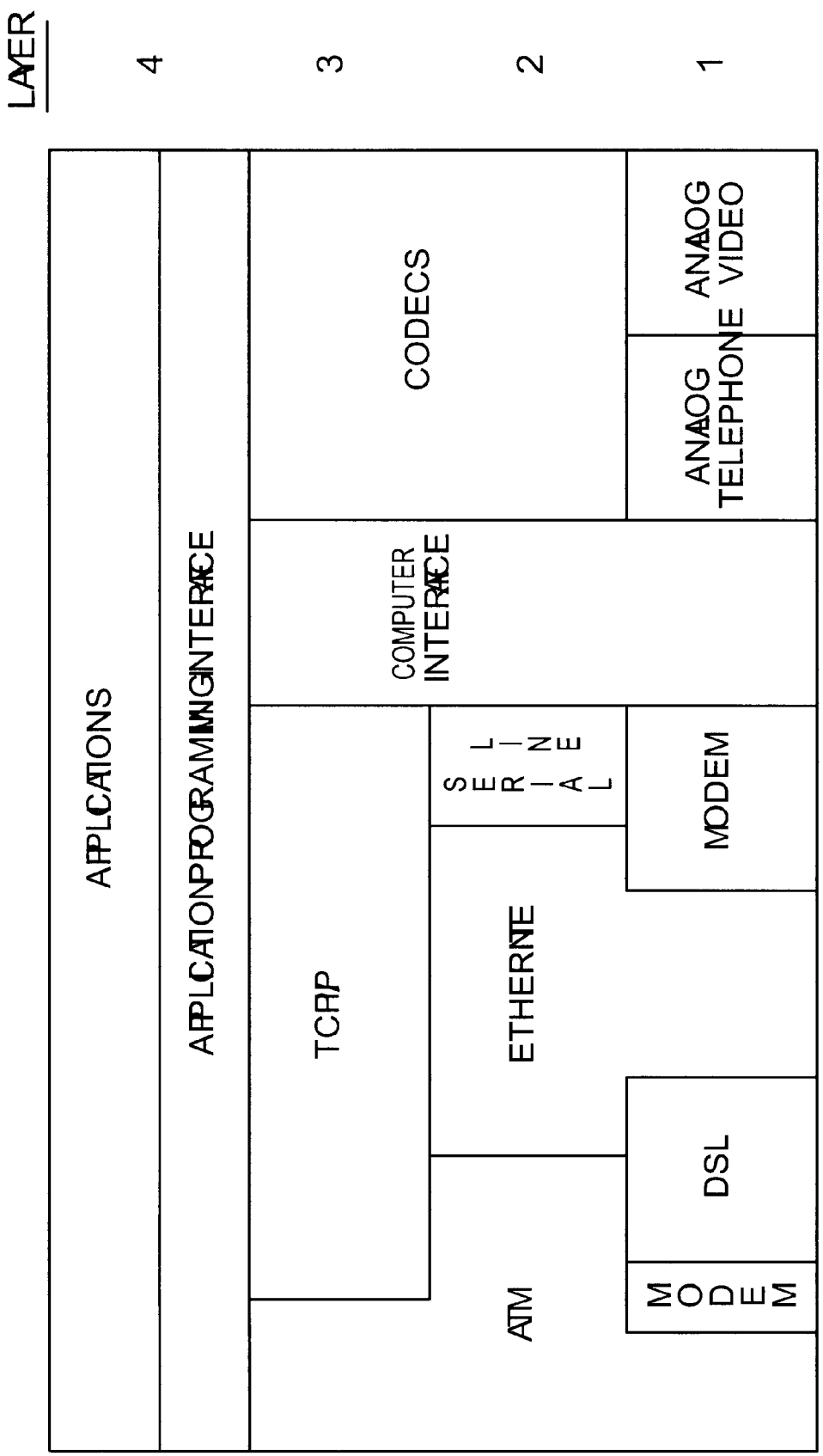
FIG. 4 illustrates a protocol stack used by the multi-services communications device in an example of the invention.

FIGS. 2–4 depict a detailed example of a multi-services communications device. The invention is not restricted to this specific example, and is only restricted by the claims following this description. Those skilled in the art will appreciate that various features and functions described below can be combined with the invention as described above to provide multiple implementations of the invention.

FIG. 2 depicts a multi-services communications device 200. The multi-services communications device 200 is comprised of: computer interface port 210, Modulator/Demodulator (modem) port 211, Ethernet port 212, Digital Subscriber Line (DSL) port 213, Asynchronous Transfer Mode (ATM) port 214, telephone port 215, video port 216, controller memory 217, battery terminal 218, input power 219, and central controller 220. Each port 210–216 could be comprised of a single port or could include multiple ports of the type shown. Those skilled in the art will recognize that some conventional elements of the multi-services communications device 200 have been omitted for clarity.

The central controller 220 is connected to the computer interface port 210 by a path 240. The central controller 220 is connected to the modem port 211 by a path 241. The central controller 220 is connected to the Ethernet port 212 by a path 242. The central controller 220 is connected to the DSL port 213 by a path 243. The central controller 220 is connected to the ATM port 214 by a path 244. The central controller 220 is connected to the telephone port 215 by a path 245. The central controller 220 is connected to the video port 216 by a path 246. The computer interface port 210 can be coupled to the computer connection 152. The network connection 182 can be coupled to the modem port 211, Ethernet port 212, DSL port 213, or ATM port 214. The telephone port 215 can be coupled to the telephone connection 172. The video port 216 can be coupled to the video connection 192.

The computer interface port 210 could be a conventional interface port, such as Ethernet, ATM, Universal Serial Bus (USB), I.E.E.E. 1394, Fiber Channel, or Small Computer System Interface (SCSI). The modem port 211 could be a conventional serial port to an analog network, such as a telephony modem, RF cable modem, or RF wireless modem. The ports 212–216 could be conventional components for their respective protocol.

The multi-services communications device 200 may receive power from a battery connected to the battery terminal 218 or a conventional power outlet connected to the input power 219. A battery power option is required if telephone service is desired during a power outage to the input power 219.

The central controller 220 allows the multi-services communications device 200 to operate autonomously from the host processor in the computer 150. Thus, the multi-services communications device 200 does not require any control input from the computer 150 to operate with robust functionality. The central controller 220 includes processing circuitry to execute software to control the exchange of various communications between the ports 210–216. Thus, communications can be exchanged from any of the ports 210–216 to any of the other ports 210–216. For example, a video device may communicate with a computer through the video port 216, central controller 220, and computer interface port 210. Communications include modem, Ethernet, ATM, DSL, Transmission Control Protocol/Internet Protocol (TCP/IP), telephony, and video. The central controller 220 also controls the exchange of data through the computer interface port 210. The controller memory 217 stores some of the software executed by the central controller 220.

FIG. 3 depicts the central controller 220. The central controller 220 is comprised of: a modem controller 221, Ethernet controller 222, DSL controller 223, ATM controller 224, telephone controller 225, video controller 226, processor memory 227, and processing core 230. Those skilled in the art will recognize that some conventional elements of the central controller 220 have been omitted for clarity.

The processing core 230 is connected to the modem controller 221, Ethernet controller 222, ATM controller 224, telephone controller 225, video controller 226, and processor memory 227. The modem controller 221 is connected to the Ethernet controller 222 and the ATM controller 224. The DSL controller 223 is connected to Ethernet controller 222 and the ATM controller 224. The modem controller 221 is connected to the path 241. The Ethernet controller 222 is connected to the path 242. The DSL controller 223 is connected to the path 243. The ATM controller 224 is connected to the path 244. The telephone controller 225 is connected to the path 245. The video controller 226 is connected to the path 246. The processing core 230 is connected to the path 240 and the path 247.

The controllers 221–226 are conventional circuitry that are operational to transfer communications in their respective protocols through their respective ports under the control of the central processing core 230. The controllers 221–224 include conventional auto-sensing functionality to process their own respective protocol and ignore other protocols. The telephone and video controllers 225–226 include digital signal processors that include coder/decoder (codec) functionality to convert between analog and digital signals. These digital signal processors also include functionality to provide compression and echo cancellation.

The processing core 230 includes circuitry to execute application software, typically stored in the processor memory 227 or controller memory 217. The processing core 230 directs the exchange of communications among the controllers 221–226 and the computer interface port 210, and arbitrates access to the network 180. The processing core 230 also executes TCP/IP software to exchange communications in the TCP/IP format and provide a routing/bridging function. To support video, the processing core 230 implements the International Telecommunications Union H.321 and H.323 video-conferencing standards.

To support voice, the processing core 230 executes application software to implement Voice over IP and Voice over ATM standards. The processing core 230 responds to in-coming and out-going calls by executing Telecommunications Information Network Architecture Consortium (TINA-C) Service Architecture Provider Agent application software. The telephone controller 225 provides an analog telephony interface to the path 245 under the control of the processing core 230. The analog telephony interface in the telephone controller 225 detects off-hook conditions, on-hook conditions, Multi-Frequency (MF) tones, and Dual Tone Multi-Frequency (DTMF) tones; and provides dial tone, ring current, ringback tones, busy tones, and other standard telephony signaling tones. An example of a provider agent and analog telephony interface is disclosed in U.S. patent application Ser. No. 09/128,944, entitled "Telecommunications Provider Agent", filed on Aug. 5, 1998, and which is hereby incorporated by reference into this application.

FIG. 4 depicts one example a protocol stack for the multi-services communications device 200. The various mappings described below indicate the protocol combinations that can be used. At layer 1, ATM, modem, DSL, Ethernet, computer interface, analog telephone, and analog video are available. ATM, modem, and DSL layer 1 map to ATM layer 2. DSL layer 1 also maps to Ethernet layer 2. Ethernet layer 1 maps to Ethernet layer 2. Modem layer 1 also maps to Ethernet layer 2 and serial line layer 2. Computer interface layer 1 maps to computer interface layer 2. Analog telephone layer 1 and analog video layer 1 map to codecs layer 2.

At layer 2, ATM layer 2 maps to ATM layer 3 and TCP/IP layer 3. Ethernet layer 2 maps to TCP/IP layer 3. Serial line layer 2 maps to TCP/IP layer 3. Computer interface layer 2 maps to computer interface layer 3. Codecs layer 2 map to codecs layer 3. At layer 3, ATM, TCP/IP, computer interface, and codecs map to the Application Programming Interface (API) at layer 4.

The API layer 4 maps to the applications at layer 4. The API includes conventional API software for each layer 3 protocol. The applications at layer 4 include the software executed by the processing core 230.

It should be appreciated from the above description that the multi-services communications device 200 can handle voice, video, and data using a variety of communications protocols. Although the multi-services communications device 200 can connect to a computer, it is not dependent on the computer for control input. The multi-services communications device 200 can handle video and telephone communications between a local telephone or video device and the communications network without any control input from the computer. The multi-services communications device 200 can also handle data communications, including TCP/IP communications, between the computer and the communications network.

Those skilled in the art will appreciate variations of the above-described embodiments that fall within the scope of the invention. As a result, the invention is not limited to the specific examples and illustrations discussed above, but only by the following claims and their equivalents.

We claim:

1. A multi-services communications device that comprises:
   a computer interface that is configured for coupling to a computer connection and that is operational to exchange data communications with the computer connection;
   a telephone interface that is configured for coupling to a telephone connection and that is operational to exchange telephone signals with the telephone connection;
   a video interface that is configured for coupling to a video connection and that is operational to exchange video signals with the video connection;
   a network interface that is configured for coupling to a network connection and that is operational to exchange asynchronous transfer mode communications, Ethernet communications, internet communications, digital subscriber line communications, and modem communications with the network connection;
   a communications processing system that is operational to control the exchange of the data communications with the computer connection, to control the exchange of the telephone signals with the telephone connection without any control input from the computer connection, to control the exchange of the video signals with the video connection, to control the exchange of the asynchronous transfer mode communications with the network connection, to control the exchange of the Ethernet communications with the network connection, to control the exchange of the internet communications with the network connection, to control the exchange of the digital subscriber line communications with the network connection, and to control the exchange of the modem communications with the network connection;
   communication paths that connect the communications processing system with the computer interface, the telephone interface, the video interface, and the network interface; and an enclosure that is operational to house the communication paths, the communications processing system, the computer interface, the telephone interface, the video interface, and the network interface.

2. The multi-services communications device of claim 1 wherein the modem communications are cable modem communications.

3. The multi-services communications device of claim 1 wherein the modem communications are wireless modem communications.

4. The multi-services communications device of claim 1 wherein the modem communications are telephone modem communications.

5. The multi-services communications device of claim 1 wherein the network interface is further operational to automatically sense a protocol used over the network connection.

6. The multi-services communications device of claim 1 further comprising a battery terminal.

7. The multi-services communications device of claim 1 further comprising a voice coder/decoder.

8. The multi-services communications device of claim 1 further comprising a video coder/decoder.

9. The multi-services communications device of claim 1 wherein the communications processing system is operational to control the telephone interface to generate and receive telephone calls.

10. The multi-services communications device of claim 9 wherein the telephone interface is operational to detect off-hook conditions, to detect on-hook conditions, to detect tones, to provide dial tone, to provide ring current, to provide ringback tones, and to provide busy tones.

* * * * *